(12) United States Patent
Teramachi

(10) Patent No.: US 6,210,039 B1
(45) Date of Patent: Apr. 3, 2001

(54) LINEAR MOTION GUIDE UNIT AND TABLE GUIDE APPARATUS UTILIZING THE SAME

(75) Inventor: Hiroshi Teramachi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 08/981,396

(22) PCT Filed: May 1, 1997

(86) PCT No.: PCT/JP97/01508

§ 371 Date: Jun. 14, 1999

§ 102(e) Date: Jun. 14, 1999

(87) PCT Pub. No.: WO97/41363

PCT Pub. Date: Nov. 6, 1997

(30) Foreign Application Priority Data

May 1, 1996 (JP) .................................................. 8-134213

(51) Int. Cl.⁷ .................................................. F16C 31/06
(52) U.S. Cl. .................................. 384/45; 384/43; 384/44; 384/49
(58) Field of Search .................................. 384/43, 44, 45, 384/49

(56) References Cited

U.S. PATENT DOCUMENTS

| | | | |
|---|---|---|---|
| 3,008,774 | * 11/1961 | Morris et al. | 384/45 |
| 4,595,244 | * 6/1986 | Teramachi | 384/15 |
| 5,137,371 | 8/1992 | Osawa | 384/45 |
| 5,240,331 | * 8/1993 | Ninomiya et al. | 384/45 |
| 5,362,156 | * 11/1994 | Hara | 384/45 |
| 5,375,931 | * 12/1994 | Teramachi | 384/45 |

FOREIGN PATENT DOCUMENTS

| | | |
|---|---|---|
| 14 25 120 B | 1/1970 | (DE) . |
| 76 22 992 U | 7/1976 | (DE) . |
| 43 31 014 C2 | 3/1995 | (DE) . |
| 296 00 917 U1 | 4/1996 | (DE) . |
| 55-46045 | 3/1980 | (JP) . |
| 55-46046 | 3/1980 | (JP) . |
| 60-40818 | 3/1985 | (JP) . |
| 2-142918 | 6/1990 | (JP) . |
| 5-52214 | 3/1993 | (JP) . |
| 6-323331 | 11/1994 | (JP) . |
| 8-21440 | 1/1996 | (JP) . |

\* cited by examiner

*Primary Examiner*—Thomas R. Hannon
(74) *Attorney, Agent, or Firm*—Armstrong, Westerman, Hattori, McLeland & Naughton

(57) ABSTRACT

An object of this invention is to provide a linear motion guide device and a table guide device having an automatic controllability and to realize a load bearing structure having a high rigidity. The device is characterized in that a movable block (4) is formed to provide an L-shape in section, rolling ball rows (B1–B4) are disposed to be rollable between ball rolling grooves formed to an upper surface of a track rail (1) and a horizontal portion of the movable block (4) and between ball rolling grooves formed to a side surface of the track rail (1) and a suspending portion (3), wherein each of the ball rolling grooves has a circular-arc-shape in section having a deep-groove shape having a groove depth of approximately ⅓ to ½ of a diameter of the rolling ball.

20 Claims, 9 Drawing Sheets

LINEAR MOTION GUIDE UNIT AND TABLE GUIDE APPARATUS UTILIZING THE SAME

TECHNICAL FIELD

The present invention relates to a linear motion guide device using rolling balls and to a table guide device using the linear motion guide device.

BACKGROUND ART

As examples of the conventional linear motion guide device of this type, for example, the devices disclosed in Japanese Patent Laid-Open Publication No. SHO 55-46045 and No. SHO 55-46046 are well known. That is, each of the devices comprises a track rail and a movable block having an L-shape in section, and the movable block further comprises a horizontal portion opposing to an upper surface of the track rail and a suspending portion opposing to one side surface of the track rail.

Two rows of rolling balls were disposed to be rollable between two opposing surfaces of the upper surface of the track rail and the horizontal portion of the movable block, and between two opposing surfaces of the one side surface of the track rail and the suspending portion of the movable block, respectively.

The conventional linear motion guide device of this type has a following contact-angle structure. Namely, in the two rows of rolling balls provided on the upper surface of the track rail, a contact angle line constituted by a line connecting the two contact points of the rolling balls to the ball rolling grooves corresponding to the respective ball rows is set to extend toward the track rail and is formed so as to incline toward a side of the suspending portion with respect to a vertical line passing a center of the rolling ball in a case of the ball row positioned close to the suspending portion side, while the other contact angle line in a case of a ball row positioned at the other side of the suspending portion is set to extend toward the track rail and is formed so as to incline toward an opposing side of the suspending portion.

In contrast, in the pair of rolling balls provided on the side surface of the track rail, a contact angle line constituted by a line connecting the two contact points of the rolling balls to the ball rolling grooves corresponding to the respective ball rows is set to extend toward the track rail and is formed so as to incline toward a side of the horizontal portion with respect to a horizontal line passing a center of the rolling ball in a case of the ball row positioned close to a side of the horizontal portion, while the other contact angle line in a case of a ball row positioned at the other side of the horizontal portion is set to extend toward the track rail and is formed so as to incline toward an opposing side of the horizontal portion.

Due to an employment of such contact-angle structure, a load-bearing capacity against loads to be applied from various directions including vertical and horizontal directions can be enhanced. In particular, it becomes possible to increase a supporting rigidity against a moment in a direction for rotating the movable block around the track rail.

In the prior art technics described above, however, since the supporting rigidity against the moment in the direction for rotating the movable block around the track rail is high, there were posed following problems. Namely, when the movable block in a state having a working error in attaching surfaces thereof is fixed to a table and then the track rail is fixed to a fixed bed, a misalignment is caused between the track rail and the movable block and an excessive force is applied to the track rail and the movable block, thus resulting in increasing of sliding resistance and promoting early wear of the ball rolling grooves and rolling balls per se. Such misalignment will be avoided by increasing working precision of the respective members of the device. However, the working precision has a limit itself and involves a cost increasing.

The present invention is achieved for solving the afore-mentioned problems and an object of the present invention is to provide a linear motion guide device and a table guide device using the linear motion guide device which has an automatic controllability and enables to realize a supporting structure having a high rigidity.

DISCLOSURE OF THE INVENTION

In order to achieve the afore-mentioned object, the present invention provides a linear motion guide device comprising:
  a track rail having a rectangular-shape in section and at least one ball rolling groove formed respectively to an upper surface and one side surface of the track rail;
  a movable block having a L-shape in section, comprising a horizontal portion provided with ball rolling grooves corresponding to ball rolling grooves formed to the upper surface of the track rail and a suspending portion provided with ball rolling grooves corresponding to ball rolling grooves formed to the one side surface of the track rail; and
  a row of rolling balls disposed to be rollable between corresponding ball rolling grooves formed to the upper surface of the track rail and the horizontal portion of the movable block and between corresponding ball rolling grooves formed to the side surface of the track rail and the suspending portion of the movable block, respectively;
  wherein each of the ball rolling grooves has a circular-arc-shape in section having a deep-groove shape having a groove depth set to approximately ⅓ to ½ of a diameter of the rolling ball.

According to the present invention, the movable block is formed in L-shape in section and has a supporting construction in which only the upper surface and one side surface of the track rail are supported by the horizontal portion and the suspending portion at a right angle, so that it becomes possible to increase a degree of freedom in a direction for inclining the horizontal portion and the suspending portion around a corner portion between the horizontal portion and the suspending portion. Therefore, even if the track rail and the movable block are formed with a working error or the device is formed with an error in a degree of parallelism between a mating surface to which the track rail is attached and a mating surface to which the movable block is fixed, a position of the movable block can be automatically adjusted and controlled by displacements of the contact points of the rolling balls rolling in the ball rolling grooves.

In addition, each of the ball rolling grooves is formed so as to have a deep-grooved shape. Therefore, even if the contact points of the rolling balls are displaced by the automatically controlling function, the rolling ball contacts to intermediate portions of an inner circumferential surface of the ball rolling groove, the intermediate portions being far deep positions from a side peripheral edge portion of the ball rolling groove. As a result, a load to be applied to the rolling ball can be dispersed and supported by the inner circumferential surface of the ball rolling groove, and there is no fear of edge-load being applied to the side peripheral edge portion of the ball rolling groove, thus achieving a high automatic controllability.

Further, the movable block is formed to be opened at one side thereof, so that the movable block can be subjected to a grinding work using a large-sized grinding stone to form the ball rolling grooves. In addition, even in a case of the deep-grooved type, the grinding work can be performed at a high efficiency, thus improving the productivity of the device.

Furthermore, the movable block is formed in an L-shape and has no under-cut portion, and the track rail is also formed in a simple rectangular-shape in section, so that the movable block can be easily formed by a drawing operation and the productivity can be improved.

In one aspect of this invention, there can be also provided a linear motion guide device in which a contact angle line constituted by a line connecting the two contact points of the rolling ball disposed between the corresponding ball rolling grooves formed to the horizontal portion of the movable block and the upper surface of the track rail is set to extend toward the track rail and is formed so as to incline toward a side of the suspended portion with respect to a vertical line passing a center of the rolling ball, and a contact angle line constituted by a line connecting the two contact points of the rolling ball disposed between the corresponding ball rolling grooves formed to the suspending portion of the movable block and the side surface of the track rail is set to extend toward the track rail and is formed so as to incline toward a side of the horizontal portion with respect to a horizontal line passing a center of the rolling ball.

Due to an employment of such contact-angle structure described above, a load in a horizontal direction for moving the suspending portion close to the side surface of the track rail is supported by the rolling balls disposed at the side surface of the track rail, while a load in a horizontal direction for moving the suspending portion away from the side surface of the track rail is supported by the rolling balls disposed at the upper surface of the track rail.

Further, a load in a direction for pressing the suspending portion on to the track rail from an upper direction is supported by the rolling balls disposed at the upper surface of the track rail, while a load in a direction for lifting the suspending portion from the track rail is supported by the rolling balls disposed at the side surface of the track rail.

In another aspect of this invention, each of the upper surface and the side surface of the track rail is arranged with at least two rows of rolling balls, respectively, and the respective at least two rows of the rolling balls disposed at the upper surface and the side surface of the track rail have a contact-angle structure in which the contact angle lines of the respective rolling balls are inclined in the same direction.

According to this construction, the load bearing ability can be increased without impairing the automatic controllability.

In another aspect of this invention, the horizontal portion of the movable block may be provided with a skirt portion having a length shorter than that of the suspending portion, the skirt portion being formed at a side surface opposing to the side surface of the horizontal portion to which the suspending portion is formed, and a row of rolling balls is disposed to be rollable between corresponding a pair of ball rolling grooves formed to the skirt portion and the side surface of the track rail.

According to such construction described above, even if a load in a direction for lifting the movable block from the track rail is applied to the device, the movable block is firmly supported by not only one side surface but also both side surfaces of the track rail, so that the load bearing ability against the lifting load can be increased.

The movable block may also be constructed so as to comprise a movable block body having a loaded ball rolling groove and a ball returning passage for returning the ball in the loaded ball rolling groove from one end to the other end of the loaded ball rolling groove and side covers provided for both end portions of the movable block body, the side cover constituting a ball turning passage for changing the ball rolling direction by receiving the ball from the loaded ball rolling groove and then guiding the ball to the ball returning passage, wherein at least one of a return passage constituting the ball returning passage structure and an inner circumferential portion constituting an inner circumferential structure of the ball turning passage is formed of a molding-shaped portion which is integrally formed to the movable block body by an insert molding method in which the mold-shaping is performed by inserting the movable block body into a shaping mold.

According to this construction, the mold-shaping operation of the movable block can be easily performed.

In another aspect of this invention, the device is characterized in that the horizontal portion of the movable block is provided with two rows of ball rolling grooves while the suspending portion is also provided with two rows of ball rolling grooves, and bolt holes for inserting attaching-bolts are formed to both central portions between the two rows of the ball rolling grooves of the horizontal portion and the suspending portion, respectively.

When the horizontal portion and the suspending portion are fastened to a table in a manner described above, the movable block is reinforced by the table, so that the rigidity of the device can be increased.

In another aspect of this invention, the device is characterized in that a plural rows of ball rolling grooves to be formed on the upper surface of the track rail are locally disposed close to one side surface side of the track rail and a bolt hole for inserting the attaching bolt is formed to a region on the upper surface of the track rail close to the other side surface side of the track rail.

As described above, when the position of the ball rolling grooves to be formed on the upper surface of the track rail is set to one side and the bolt inserting hole for fastening the track rail is formed at the other side portion, it can be possible to prevent an extraneous substance from invading into the ball rolling grooves.

On the other hand, a table guide device according to the present invention is characterized by comprising a fixed bed, a pair of linear motion guide devices arranged in parallel with the fixed bed and table to be assembled through the paired linear motion guide devices;

wherein the linear motion guide device described above is used as the linear motion guide device, the paired track rails of the paired linear motion guide devices are symmetrically disposed on the upper surface of the fixed bed so that the side surfaces of the track rails to which the ball rolling grooves are formed are faced to inside or outside to each other, the side surface of the track rail opposing to the side surface to which the ball rolling grooves are formed is set to be a reference surface for attachment, and the fixed bed is formed to have a reference wall for supporting the reference surface for attachment of the track rail.

In addition, the device is characterized in that a height of the reference wall is set to a height corresponding to that of the ball rolling groove formed to the side surface opposing to the reference surface of attachment.

According to the table guide device of this invention, a pair of right and left movable blocks are fixed to the table, so that the device, as a whole, has a structure in which the side surfaces of the right and left track rails are clamped by the suspending portions of the respective right and left movable blocks. Therefore, as a whole, the rigidity in the direction for rotating the movable blocks around the track rails is increased, and there can be realized a table guide device having a high load bearing performance against the loads in every direction including horizontal and vertical directions.

Further, even if the working errors or the like are caused to attaching surfaces of the track rails and the movable blocks, the automatic controlling function of the linear motion guide device is effected as described above, so that the misalignment between the track rail and the movable block is absorbed and automatically controlled by the displacements of the contact points of the balls rolling within the ball rolling grooves. As a result, the table can be smoothly guided.

In addition, the ball rolling grooves can be simultaneously formed by a grinding operation in a state where the two rows of track rails are fixed in parallel to each other, so that the parallel tracks and grooves having a high accuracy can be obtained.

Furthermore, when the table is provided with supporting walls for supporting rear surfaces of the suspending portions of the respective right and left movable blocks, the load in a horizontal direction applied to the table is directly transferred to the movable blocks not through the attaching bolts but through the supporting walls, and then transferred from the movable blocks to the track rails thereby to be directly supported by the reference walls of the fixed bed. Accordingly, the load in a horizontal direction would not apply from a shearing direction to the attaching bolt for fastening the movable block or the attaching bolt for fastening the track rail, so that there can be provided a table guide device with a structure having an extremely high rigidity.

In addition, the table guide device in another aspect of this invention may comprise a preload controlling mechanism provided between at least one of the supporting walls and the suspending portion of the movable block, the preload controlling mechanism is constructed in a manner that the movable block is forcibly pressed to the track rail side by utilizing the supporting wall as a supporting member so as to increase a preload of the balls disposed between the movable blocks and track rails, a reaction force applied to the supporting wall as a reaction force of the pressing force is applied to another supporting wall through the table, then a suspending portion of another movable block is pressed to another track rail by the reaction force thereby to increase the preload of the balls. When the preload controlling mechanism described above is provided to the table guide device, the supporting rigidity of the whole of the table can be increased.

In particular, when a tapered gib formed of a block body to be face-contacted to the rear surface of the suspending portion is used as the preload controlling mechanism and disposed between the supporting wall and the suspended portion of the movable block, it is possible to uniformly impart the preload to the ball rows. In addition, the rigidity between the suspending portion and the supporting wall can also be maintained to a high level.

Further, in another aspect of this invention, the linear motion guide device is characterized in that the track rail is provided with at least one ball rolling groove to be formed to the upper surface and another side surface of the track rail, respectively, and the movable block defined in claim 1 is assembled to right and left corner portions between the upper surface and lateral side surfaces of the track rail.

That is, the linear motion guide device is characterized by comprising:

a track rail provided with at least one ball rolling groove formed to right and left half portions of an upper surface and lateral side surfaces of the track rail, respectively;

a pair of movable blocks provided on a right and a left corner portions between the upper surface and the lateral side surfaces of the track rail, each of the movable blocks having an L-shape cross section and further comprising a horizontal portion provided with a ball rolling groove corresponding to the ball rolling groove formed to the right and left half portions of the upper surface of the track rail and a suspending portion provided with a ball rolling groove corresponding to the ball rolling groove formed to the lateral side surfaces of the track rail;

a row of rolling balls disposed to be rollable between the ball rolling grooves formed to the upper surface of the track rail and the horizontal portions of the paired movable blocks; and a row of rolling balls disposed to be rollable between the ball rolling grooves formed to the lateral side surfaces of the track rail and the suspended portions of the paired movable blocks;

wherein each of the ball rolling grooves is formed to be a deep-grooved shape having a circular-arc-shape in section, and a groove depth is set to approximately ⅓ to ½ of a diameter of the rolling ball.

In another aspect of this invention, there can be also provided a linear motion guide device in which a contact angle line constituted by a line connecting the two contact points of the rolling ball disposed between the corresponding ball rolling grooves formed to the horizontal portions of the paired movable blocks and the upper surface of the track rail is set to extend toward the track rail and is formed so as to incline toward the respective suspending portions of the paired movable blocks with respect to a vertical line passing a center of the rolling ball, and a contact angle line constituted by a line connecting the two contact points of the rolling ball disposed between the corresponding ball rolling grooves formed to the suspending portions of the paired movable blocks and the side surfaces of the track rail is set to extend toward the track rail and is formed so as to incline toward a side of the horizontal portion of the respective movable blocks with respect to a horizontal line passing a center of the rolling ball.

Further, the linear motion guide device is characterized in that each of the ball rows disposed at the right and left half portions of the upper surface and right and left side surfaces of the track rail consists of two rows of rolling balls and the respective two rows of rolling balls have a contact angle arrangement so that the contact angle lines thereof are inclined to the same direction to each other.

Furthermore, the linear motion guide device is characterized in that the track rail is a rail having a wide width.

Furthermore, the table guide device is characterized by comprising a fixed bed and a linear motion guide device formed by combining aforementioned one track rail and the paired movable blocks, wherein the track rail of the linear motion guide device is fixed to the fixed bed and a table is fixed to the paired first and second movable blocks.

According to the arrangement described above, even in a case of assembling the table guide device, a pair of guide rails are not required and it is sufficient to prepare only one track rail, whereby an applicable range of the table guide device can be broadened. In particular, in a case where a pair of the track rails are used, the paired track rails are required to have a high attaching performance. However, the requirement for such attaching accuracy can be neglected in this case, because of using one track rail.

Further, it is preferable to use a rail having a wide width as the track rail, because the stability of the device can be improved by using such wide-width track rail. In addition, due to the wide-width track rail, the load bearing ability with respect to an angular moment around a center axis of the track rail can be increased.

The characteristics and functions of the features that the movable block is formed to provide an L-shape in section and the ball rolling groove is formed to be a deep-grooved shape have been described hereinabove.

BEST MODE FOR EMBODYING THE INVENTION

In order to explain the present invention in more detail, the preferred embodiments of the invention will be be described hereunder with reference to the accompanying drawings.

Figure 1:
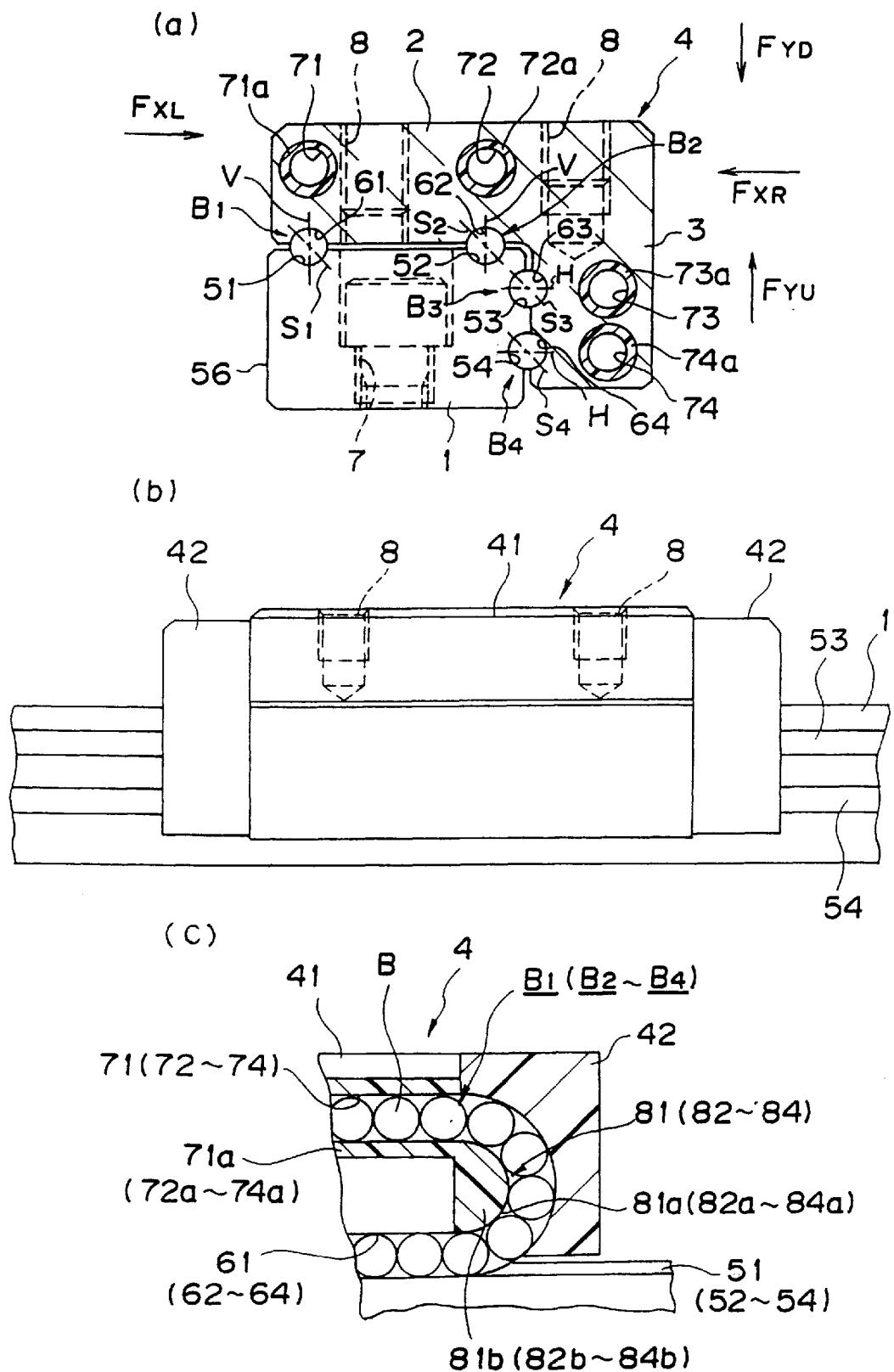
FIG. 1 is a view showing one embodiment of a linear motion guide device according to the present invention, in which FIG. 1 (a) is a cross sectional view of the linear motion guide device, FIG. 1 (b) is a side view of the linear motion guide device and FIG. 1 (c) is a partially sectional view showing a ball recirculating passage of the linear motion guide device.

FIG. 1 is a view showing a first embodiment of a linear motion guide device according to the present invention. The linear motion guide device comprises a track rail 1 having a rectangular shape in section, a movable block 4 having an L-shape in section, the movable block 4 further comprising a horizontal portion 2 opposing to an upper surface of the track rail 1 and a suspending portion 3 opposing to one side surface of the track rail 1 and ball rows B1, B2, B3 and B4 each consisting of two rows of a number of rolling balls disposed to be rollable between the upper surface of the track rail 1 and the horizontal portion 2 of the movable block 4 and between the side surface of the track rail 1 and the suspending portion 3.

The track rail 1 is formed to provide a rectangular shape in section so that each of upper and lower surfaces and lateral right and left side surfaces of the track rail 1 has a plain surface. Two rows of ball rolling grooves 51 to 54 are formed to the upper surface and one side surface of the track rail 1, respectively. The ball rolling grooves 51 and 52 formed to the upper surface are provided at portions close to the lateral right and left end portions so as to be symmetric with respect to a center of the track rail 1. At the center portion of the track rail 1, there is formed a bolt inserting hole 7 for inserting an attaching bolt for fixing the track rail 1 so as to vertically pass through the track rail 1. Ball rolling grooves 53 and 54 are also formed to the side surface of the track rail 1 so as to be symmetric in vertical direction. An interval of adjacent ball rolling grooves 53 and 54 formed to the side surface of the track rail 1 is smaller than that of the ball rolling grooves 51 and 52 formed to the upper surface of the track rail 1.

At a lower surface of the horizontal portion 2 of the movable block 4 is provided with two rows of ball rolling grooves 61 and 62 corresponding to the ball rolling grooves 51 and 52 formed to the track rail 1, while the suspending portion 3 is provided with two rows of ball rolling grooves 63 and 64 corresponding to the ball rolling grooves 53 and 54 formed to the one side surface of the track rail 1. A bolt hole 8 for fixing the movable block 4 is respectively formed to a portion between the two rows of ball rolling grooves 61 and 62 of the horizontal portion 2 and at an upper portion of the suspending portion 3.

Each of the ball rolling grooves 51–54 and 61–64 of the track rail 1 and the movable block 4 has a circular-arc shape in section and formed to provide a deep-grooved shape having a groove depth of approximately ⅓ to ½ of a diameter of the rolling ball.

In addition, each of the contact angle lines S1 and S2 each constituted by a line connecting two contact points of the ball rows B1 and B2 disposed between the corresponding ball rolling grooves 51, 61; 52, 62 formed to the horizontal portion 2 of the movable block 4 and the upper surface of the track rail 1 is set to extend toward the track rail 1 and is formed so as to incline toward a side of the suspending portion 3 with respect to a vertical line V passing a center of the rolling ball. When the ball diameter of the respective ball rows B1 and B2 is set to a large diameter larger than a distance between the two contact points of the rolling ball which contacts to the respective ball rolling grooves, a preload can be imparted to the rolling balls of the respective ball rows B1 and B2.

On the other hand, each of the contact angle lines S3 and S4 each constituted by a line connecting the two contact points of the ball rows B3 and B4 disposed between the corresponding ball rolling grooves 53, 63; 54, 64 formed to the suspending portion 3 of the movable block 4 and the side surface of the track rail 1 is set to extend toward the track rail 1 and is formed so as to incline toward a side of the horizontal portion 2 of the movable block 4 with respect to a horizontal line H passing a center of the rolling ball. Further, in this case, when the ball diameter of the respective ball rows B3 and B4 is set to a diameter larger than a distance between the two contact points of the rolling ball which contacts to the respective ball rolling grooves 53, 63; 54, 64, a preload can be imparted to the rolling ball of the respective ball rows B1 and B2.

The movable block 4 comprises a movable block body 41 having loaded ball rolling grooves 61–64 and ball return passages 71–74 for returning the balls from one end to the other end of the loaded ball rolling grooves 61–64 and side covers 42 and 42 provided at both end portions of the movable block body 41, each of the side covers 42 and 42 constituting ball rolling direction turning passages 81–84 for receiving the ball B from the loaded ball rolling grooves 61–64 and then guiding the ball B to the ball return passages 71–74.

In addition, at least one of return passage members 71a–74a constituting the ball return passages 71–74 and an inner circumferential portion member 81b–84b constituting inner peripheral guide portions 81a–84a of the ball rolling direction turning passages 81–84 is formed of a molding-shaped portion which is integrally formed with the movable block body 41 by an insert-molding method in which the mold-shaping operation is performed by inserting the movable block body 41 into a shaping mold.

Under certain circumstances, there may be a case where a ball retainer (not shown) is provided at a side peripheral portion of the loaded ball rolling grooves 61–64 so as to prevent the ball B from dropping off from the movable block 4 when the movable block 4 is detached from the track rail 1. In this case, the ball retainer may also be integrally formed with the movable block body 41 together with the inner peripheral guide portion members 81b–84b and the ball returning passage members 71a–74a.

According to the present invention, a load FXR in the horizontal direction for moving the suspending portion 3 close to the side surface of the track rail 1 is born by the two rows of rolling balls B3 and B4 disposed at the side surface of the track rail 1, while a load FXL in a horizontal direction for moving the suspending portion 3 away from the side surface of the track rail 1 is born by the two rows of rolling balls B1 and B2 disposed at the upper surface of the track rail.

Further, a load FYD in the vertical direction for pressing the movable block 4 onto the upper surface of the the track rail 1 from an upper direction is born by the two rows of rolling balls B1 and B2 disposed at the upper surface of the track rail 1, while a load FYU in the vertical direction for lifting the movable block 4 from the track rail 1 is born by the two rows of rolling balls B3 and B4 disposed at the side surface of the track rail 1. Accordingly, the loads in four directions can be born by one movable block 4.

On the other hand, the movable block 4 is formed to have a load bearing construction in which the upper surface and the one side surface of the track rail 1 are born by the horizontal portion 2 and the suspending portion 3 of the movable block 4 at a right angle, and both of the contact angle lines S1 and S2 of the two rows of rolling balls B1 and B2 disposed at the upper surface are formed to extend toward the track rail 1 and to incline toward a side of the suspending portion 3 with respect to a vertical line V, while both of the contact angle lines S3 and S4 of the two rows of the rolling balls B3 and B4 disposed at the side surface are are formed to extend toward the track rail 1 and to incline toward a side of the horizontal portion 2 with respect to a horizontal line H. Therefore, the rigidity in the direction for rotating the movable block 4 around a center axis of the track rail 1 is small.

Accordingly, even if the track rail 1 and the movable block 4 are formed with a working error or the device is formed with an angular error between a mating surface to which the track rail 1 is attached and a mating surface to which the movable block 4 is fixed, a position of the movable block 4 can be automatically controlled by displacements of the contact points of the rolling balls B rolling in the ball rolling grooves 51–54 and 61–64.

In addition, each of the ball rolling grooves 51–54 and 61–64 is formed so as to have a deep-groove shape. Therefore, even if the contact points of the rolling balls B are displaced by the automatically controlling function, the rolling balls B1–B4 contact to intermediate portions of an inner circumferential surface of the ball rolling grooves 51–54 and 61–64, the intermediate portions being far deep positions from a side peripheral edge portions of the ball rolling grooves 51–54 and 61–64. As a result, a load to be applied to the rolling ball B can be dispersed and born by the inner circumferential surface of the ball rolling grooves 51–54 and 61–64, and there is no fear of the ball contacting to the side peripheral edge portion of the ball rolling grooves 51–54 and 61–64, thus achieving a high automatic controllability.

Further, the movable block 4 is formed to be opened at one side thereof, so that the movable block 4 can be subjected to a grinding work using a large-sized grinding stone to form the ball rolling grooves 61–64. In addition, even in a case of the deep-groove type, the grinding work can be performed at a high efficiency, thus improving the productivity of the device.

Furthermore, the movable block 4 is formed in an L-shape in section and has no under-cut portion, and the track rail 1 is also formed in a simple rectangular-shape in section, so that the movable block 4 can be easily formed by a drawing operation, thus improving the productivity.

Figure 2:
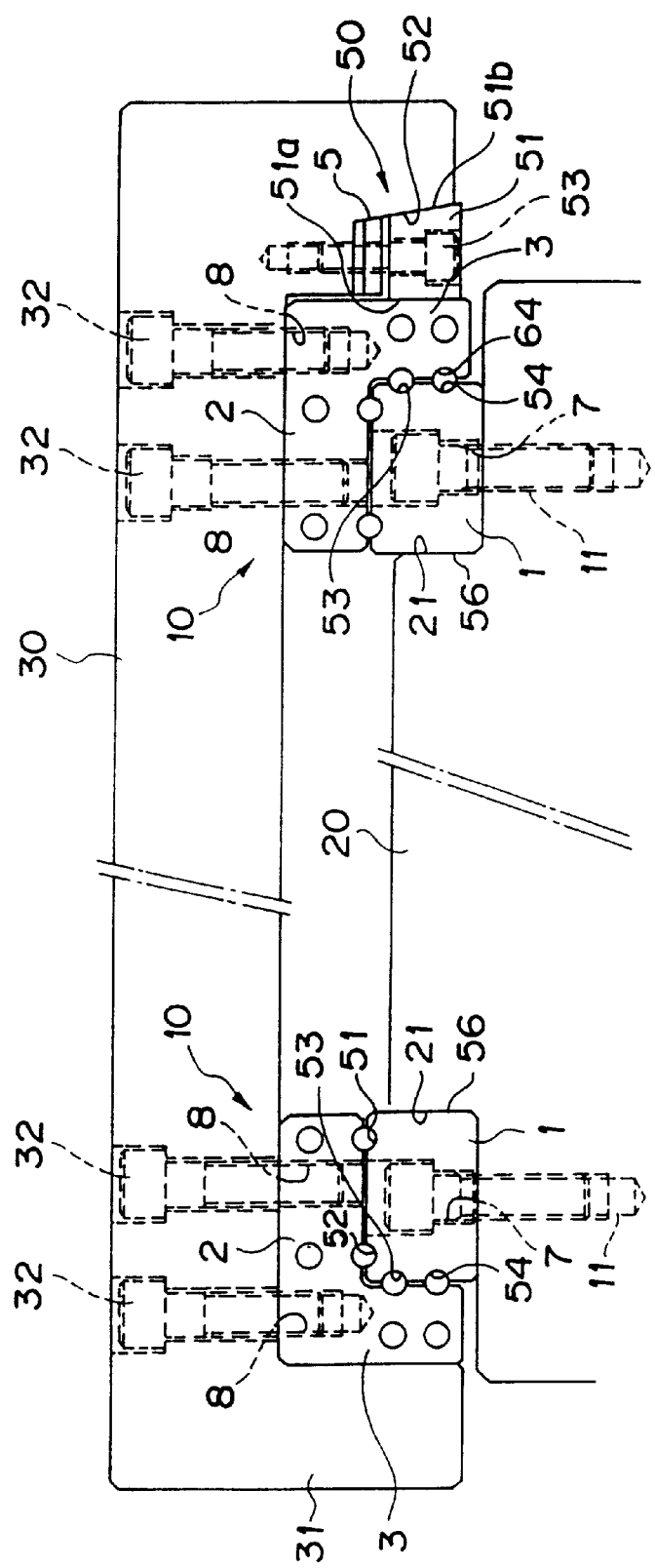
FIG. 2 is a cross sectional view showing one embodiment of a table guide device according to the present invention in which the linear motion guide device shown in FIG. 1 is used.

FIG. 2 is a view showing a table guide device in which aforementioned linear motion guide device is used.

This table guide device comprises a fixed bed 20, a pair of linear motion guide devices 10 and 10 arranged in parallel with the fixed bed 20 and a table 30 to be assembled through the paired linear motion guide devices 10 and 10.

The linear motion guide device described above is used as the linear motion guide devices 10 and 10 and a pair of track rails 1 and 1 of the paired linear motion guide devices 10 and 10 are symmetrically arranged on the upper surface of the fixed bed 20 so that the side surfaces of the track rails 1 and 1 to which the ball rolling grooves 53 and 54 are formed are faced to outside to each other. The side surfaces of the respective track rails 1 and 1 opposing to the side surfaces, to which the ball rolling grooves 53 and 54 are formed, are set as reference surfaces 56 and 56 for attachment, and the fixed bed 20 is formed with a pair of parallel reference walls 21 and 21 for supporting the reference surfaces 56 and 56 for attaching the track rails 1 and 1. Each of heights of the reference walls 21 and 21 is set to a height corresponding to that of the ball rolling grooves 53 and 54 formed to the side surfaces opposing to the reference surfaces 56 and 56 for attachment. Accordingly, the reference surfaces 56 and 56 for attaching the track rails 1 and 1 can be set to an almost the same height of the movable block 4, thus assembling the table structure in sufficiently small size.

According to the table guide device of the present invention, a pair of right and left movable blocks 4 and 4 are fixed to the table 30, so that the device as a whole has a structure in which the side surfaces of the right and left track rails 1 and 1 are clamped by the suspending portions 3 and 3 of the respective right and left movable blocks 4 and 4. Therefore, as a whole, the rigidity in the direction for rotating the movable blocks 4 and 4 around the track rails 1 and 1 is increased. As a result, there can be realized a table guide device having a high load bearing performance against the loads in every direction including horizontal and vertical directions.

Further, even if there is caused a working error or the like to attaching surfaces of the track rail 1 and the movable block 4, the automatic controlling function of the linear motion guide device is effected as described above, so that the misalignment between the track rail 1 and the movable block 4 is absorbed and automatically controlled by the displacements of the contact points of the balls B rolling within the ball rolling grooves 51–54 and 61–64. As a result, the table 30 can be smoothly guided.

In addition, the ball rolling grooves 51–54 can be simultaneously formed by a grinding operation in a state where the two rows of track rails 1 and 1 are fixed in parallel to each other, so that the parallel tracks having a high accuracy can be obtained.

Furthermore, the table 30 is provided with supporting walls 31 and 31 for supporting rear surfaces of the suspending portions 3 and 3 of the respective right and left movable blocks 4 and 4. The supporting walls 31 and 31 support the respective suspending portions 3 and 3 in an entire range corresponding to a height of the suspending portion 3, and are constructed so as to oppose to the reference wall 21 of the fixed bed 20 through the suspending portions 3, 3 and the track rails 1, 1 in the horizontal direction at the same height as that of the reference wall 21.

Since the supporting wall 31 is provided, the load in a horizontal direction applied to the table 30 is directly transferred to the movable block 4 not through the attaching bolt 32 but through the supporting wall 31, and then transferred from the movable blocks 4, 4 to the track rails 1, 1 thereby to be directly supported by the reference wall 21 of the fixed bed 20. Accordingly, the load in a horizontal direction would not apply from a shearing direction to the attaching bolt 32 for fastening the movable block 4 or the attaching bolt 11 for fastening the track rail 1, so that there can be provided a table guide device with a construction having an extremely high rigidity.

In addition, the suspending portion 3 of the movable block 4 is reinforced by the supporting wall 31, so that a bending deformation of the suspending portion 3 due to a moment load can be sufficiently prevented.

On the other hand, the table guide device is provided with a preload controlling mechanism installed between one side of the supporting wall 31 of the table 20 and the suspending portion 3 of the movable block 4, the preload controlling mechanism being constructed in a manner that the movable block 4 is forcibly pressed to a side of the track rail 1 by utilizing the supporting wall 31 as a supporting member so as to increase a preload to be applied to the ball rows B3 and B4 disposed between the movable block 4 and track rail 1, a reaction force applied to the supporting wall 31 as a reaction force of the pressing force is applied to another supporting wall 31 through the table 30, and then a suspending portion 3 of another movable block 4 is pressed to another track rail 1 by the reaction force thereby to increase the preload of the ball rows B3 and B4.

As the preload controlling mechanism described above, various constructions will be applicable. In this embodiment, a tapered gib 51 composed of a block body face-contacting to a rear surface of the suspending portion 3 is provided between the supporting wall 31 of the table 30 and the suspending portion 3 of the movable body 4.

That is, the preload controlling mechanism 50 comprises the tapered gib 51, a tapered groove 52 having a tapered surface into which the tapered gib 51 is inserted and a bolt 53 for fixing the tapered gib 51. The tapered gib 51 is composed of the block body having a high rigidity, one side surface thereof is formed to be a plain vertical surface 51a face-contacting to the rear surface of the suspending portion 3 of the movable block 4, while the other side surface thereof is formed to be a tapered surface 51b of which width decreases along an upper direction as viewed. In contrast, the tapered groove 52 provided to the supporting wall 31 of the table 30 is formed to have an inclined surface against which the tapered surface 51b of the tapered gib 51 abuts.

When the tapered gib 51 face-contacting to the suspending portion 3 is used, it becomes possible to uniformly impart the preload to the ball rows B3 and B4. In addition, the rigidity between the suspended portion 3 and the supporting wall 31 can also be maintained to a high level.

Figure 3:
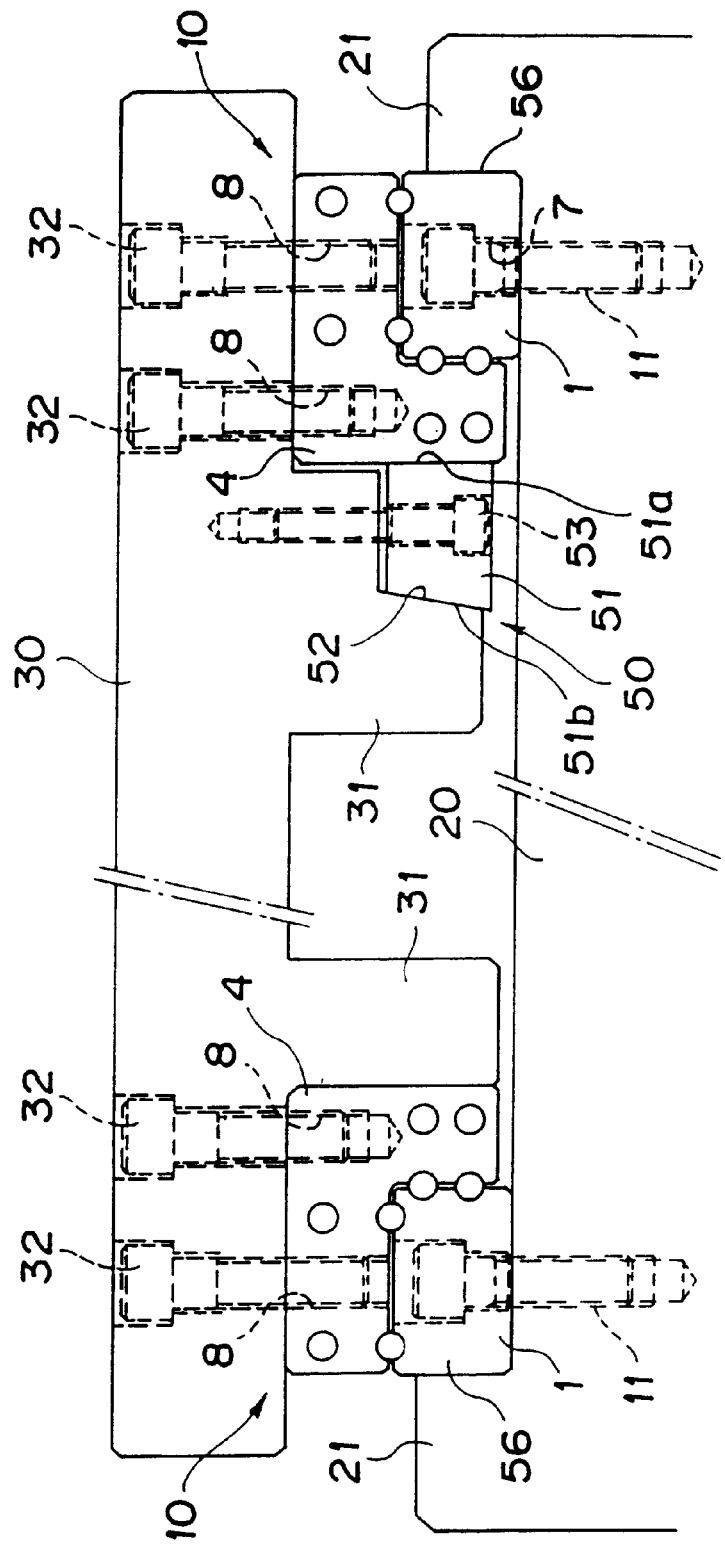
FIG. 3 is a cross sectional view showing another embodiment of a table guide device according to the present invention in which the linear motion guide device shown in FIG. 1 is used.

In this regard, in the embodiment of the table guide device described above, the paired linear motion guide devices are arranged so that the suspending portions 3 and 3 of the respective movable blocks are positioned outside the track rails 1 and 1. However, as shown in FIG. 3, the paired linear motion guide devices can also be arranged so that the suspending portions 3 and 3 of the paired movable blocks 4 and 4 are positioned inside the track rails 1 and 1, this arrangement being reverse to that of the embodiment described above.

In this case, the reference wall 21 of the fixed bed 20 is positioned outside the respective track rails 1 and 1, while the supporting wall 31 of the table 30 is formed inside of the respective movable blocks 4 and 4. In addition, the preload controlling mechanism 50 is also provided inside the movable blocks 4 and 4.

OTHER EMBODIMENTS

FIGS. 4–9 show the other embodiments of the linear motion guide device and the table guide device using the linear motion guide device according to the present invention.

Further, in the following explanations, only the points different from those of the above embodiment will be explained. Namely, detailed explanations regarding to the same constitutional elements or parts as those in the embodiment will be omitted by adding the same reference numerals to the corresponding elements or parts.

Figure 4:
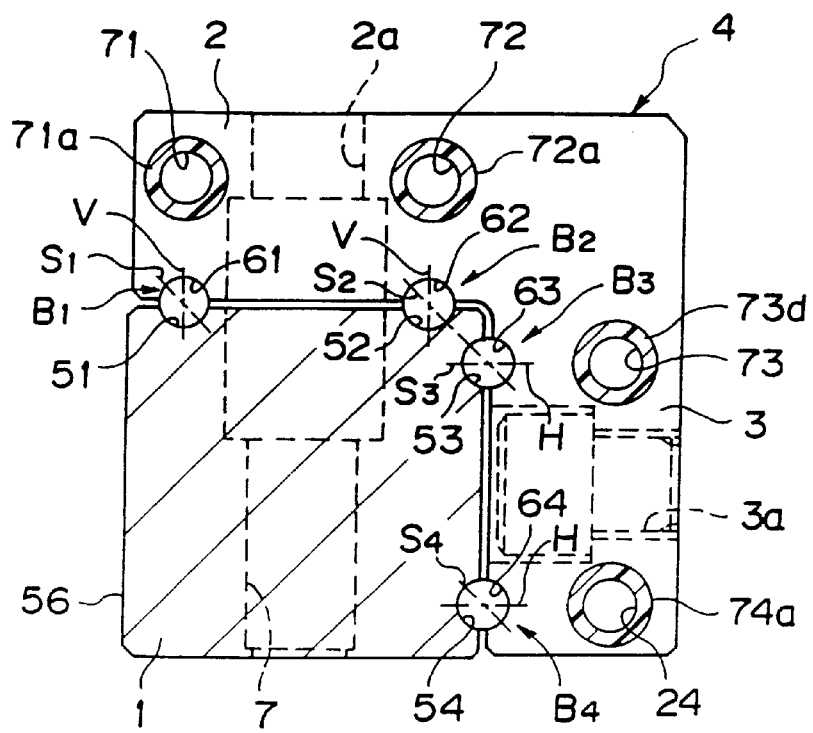
FIG. 4 is a cross sectional view showing another embodiment of a linear motion guide device according to the present invention.

In the embodiment of the linear motion guide device shown in FIG. 4, the horizontal portion 2 of the movable block 4 is provided with two rows of ball rolling grooves 61 and 62 while the suspending portion 3 is also provided with two rows of ball rolling grooves 63 and 64, and bolt holes 2a and 3a for inserting attaching-bolts are provided at corresponding central portions between the two rows of the ball rolling grooves 61 and 62 of the horizontal portion 2 and the suspending portion 3, respectively.

Figure 5:
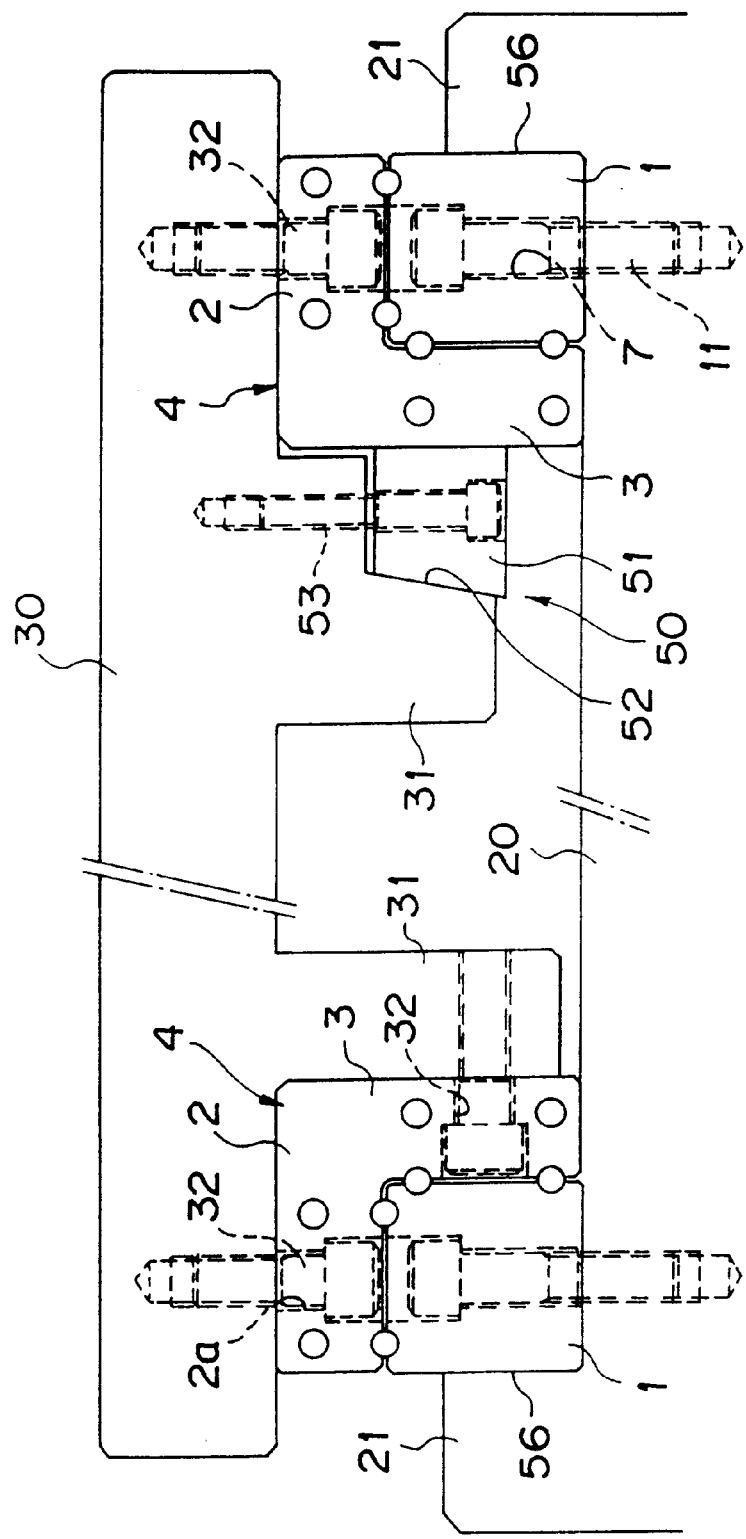
FIG. 5 is a cross sectional view showing one embodiment of a table guide device according to the present invention in which the linear motion guide device shown in FIG. 4 is used.

FIG. 5 shows a construction of a table guide device to which the linear motion guide device of this type is applied so that the suspending portions 3 and 3 of the paired right and left movable blocks 4 and 4 are positioned inside the track rails 1 and 1. As like this case, when the horizontal portion 2 and the suspending portion 3 are fastened to the table 30, the movable block 4 is reinforced by the table 30, so that the rigidity of the device can be increased.

As a matter of course, it is also possible to adopt a construction in which the suspending portion 3 of the movable block 4 is positioned outside the track rail 1.

Figure 6:
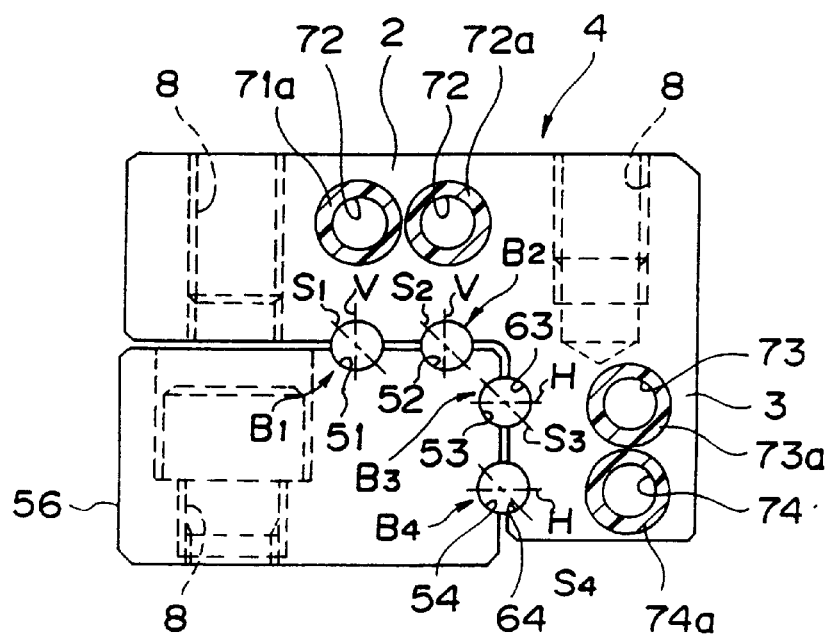
FIG. 6 is a cross sectional view showing further embodiment of a linear motion guide device according to the present invention.

FIG. 6 shows a construction of a linear motion guide device in which a plurality rows of the ball rolling grooves 61 and 62 to be formed to the upper surface of the track rail 1 are collectively positioned at the upper surface close to the one side surface to which the ball rolling grooves 63 and 64 are formed, and a bolt hole 8 for inserting the attaching bolt is formed at a region on the upper surface close to the other side surface of the track rail 1.

As like this manner, when the positions of the ball rolling grooves 61 and 62 are arranged to one side of the upper surface of the track rail 1 and the bolt hole 8 for fastening the track rail 1 is formed at the other side portion, it becomes possible to prevent an extraneous substance from invading into the ball rolling grooves 61 and 62.

Figure 7:
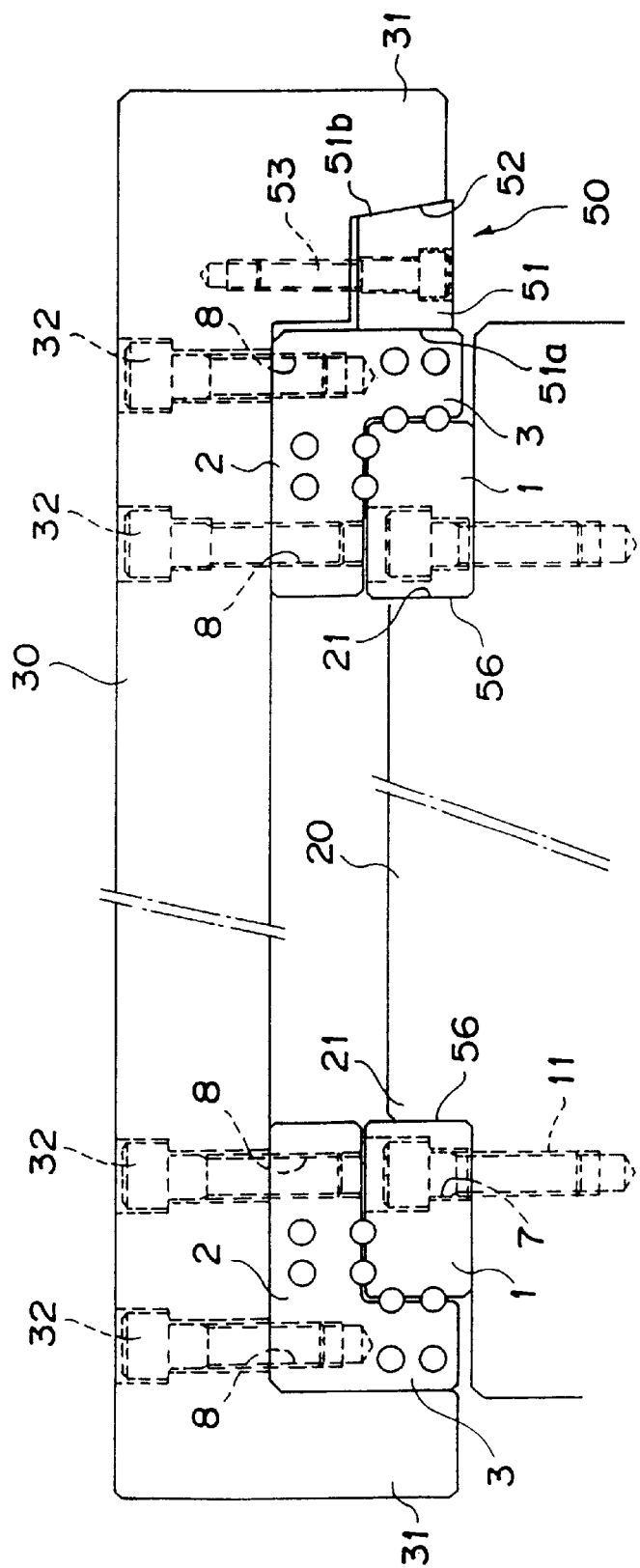
FIG. 7 is a cross sectional view showing one embodiment of a table guide device according to the present invention in which the linear motion guide device shown in FIG. 6 is used.

FIG. 7 shows a structure of a table guide device to which the linear motion guide device of this type is applied so that the suspending portions 3 and 3 of the paired right and left movable blocks 4 and 4 are positioned inside the track rails 1 and 1. As a matter of course, the suspending portions 3 and 3 of the movable blocks 4 and 4 can be also positioned outside the track rail 1.

Figure 8:
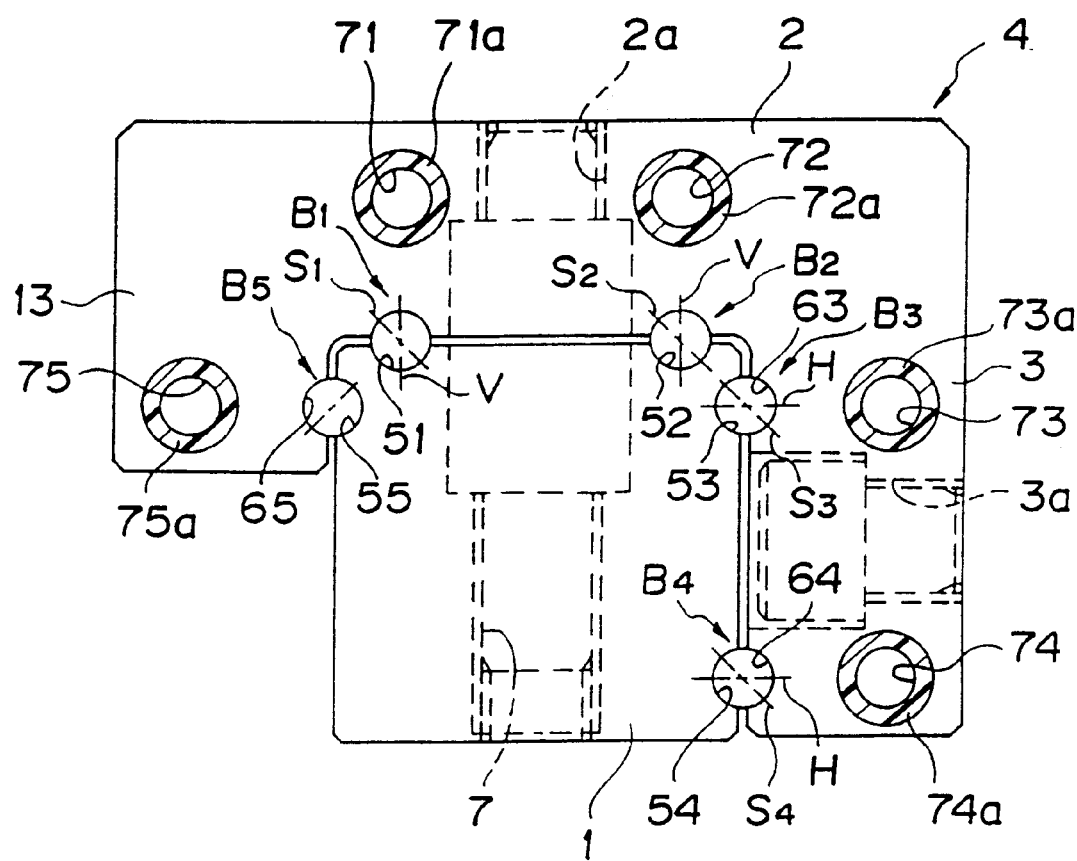
FIG. 8 is a cross sectional view showing still further embodiment of a linear motion guide device according to the present invention.

FIG. 8 shows a structure of a linear motion guide device in which the horizontal portion 2 of the movable block 4 is provided with a skirt portion 13 having a length shorter than that of the suspending portion 3, the skirt portion 13 being formed at a side surface opposing to the side surface of the horizontal portion to which the suspending portion 3 is formed, and a row of rolling balls B5 is disposed to be rollable between corresponding a pair of ball rolling grooves 55 and 65 formed to the skirt portion 13 and the side surface of the track rail 1.

According to such structure described above, even if a load in a direction for lifting the movable block 4 from the track rail 1 is applied to the device, the movable block 4 is firmly born by not only one side surface but also both side surfaces of the track rail 1, so that the load bearing ability against the lifting load can be increased.

Figure 9:
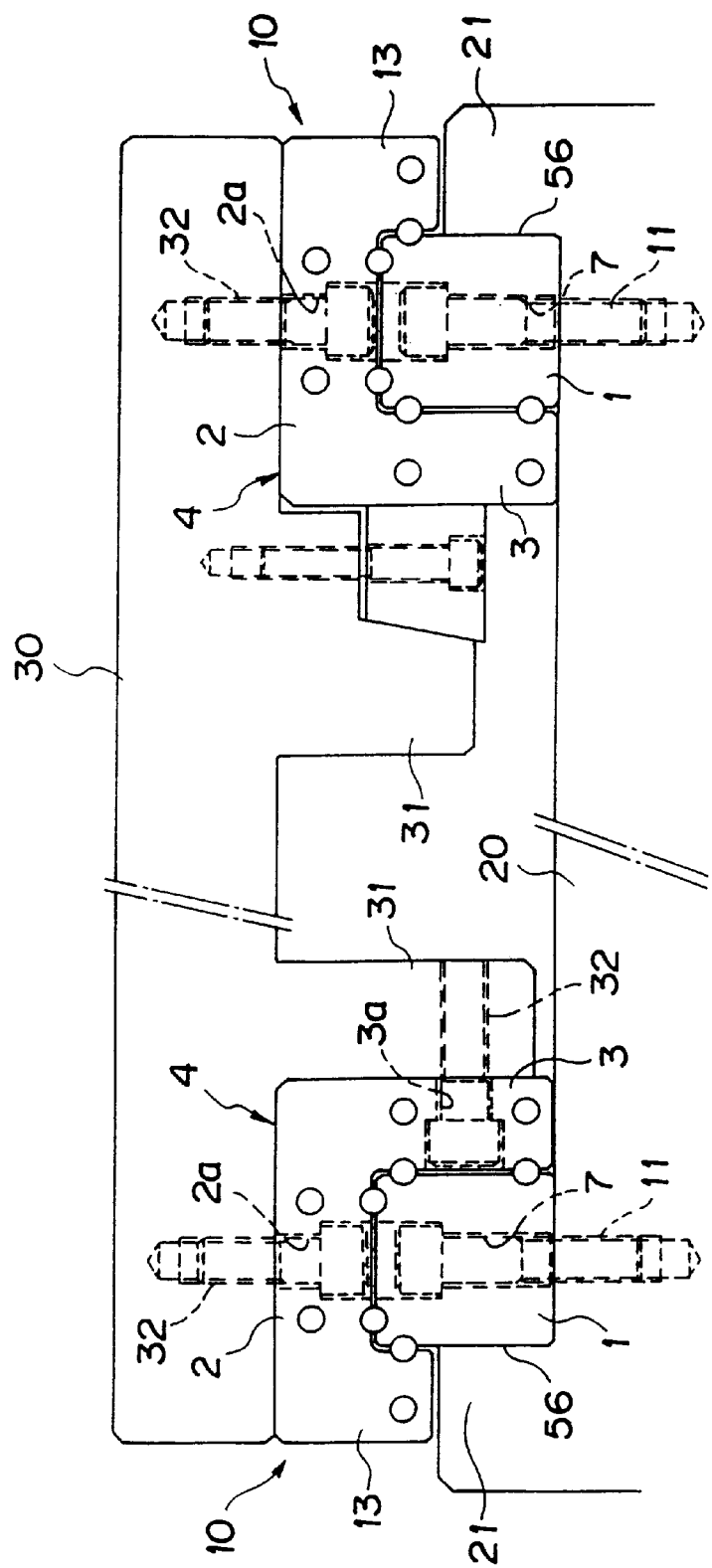
FIG. 9 is a cross sectional view showing one embodiment of a table guide device according to the present invention in which the linear motion guide device shown in FIG. 8 is used.

FIG. 9 shows a construction of a table guide device to which the linear motion guide device of this type is applied so that the suspending portions 3 and 3 of the paired right and left movable blocks 4 and 4 are positioned inside of the track rails 1 and 1. As a matter of course, the suspending portions 3 and 3 of the movable blocks 4 and 4 can be also positioned outside of the track rail 1.

Figure 10:
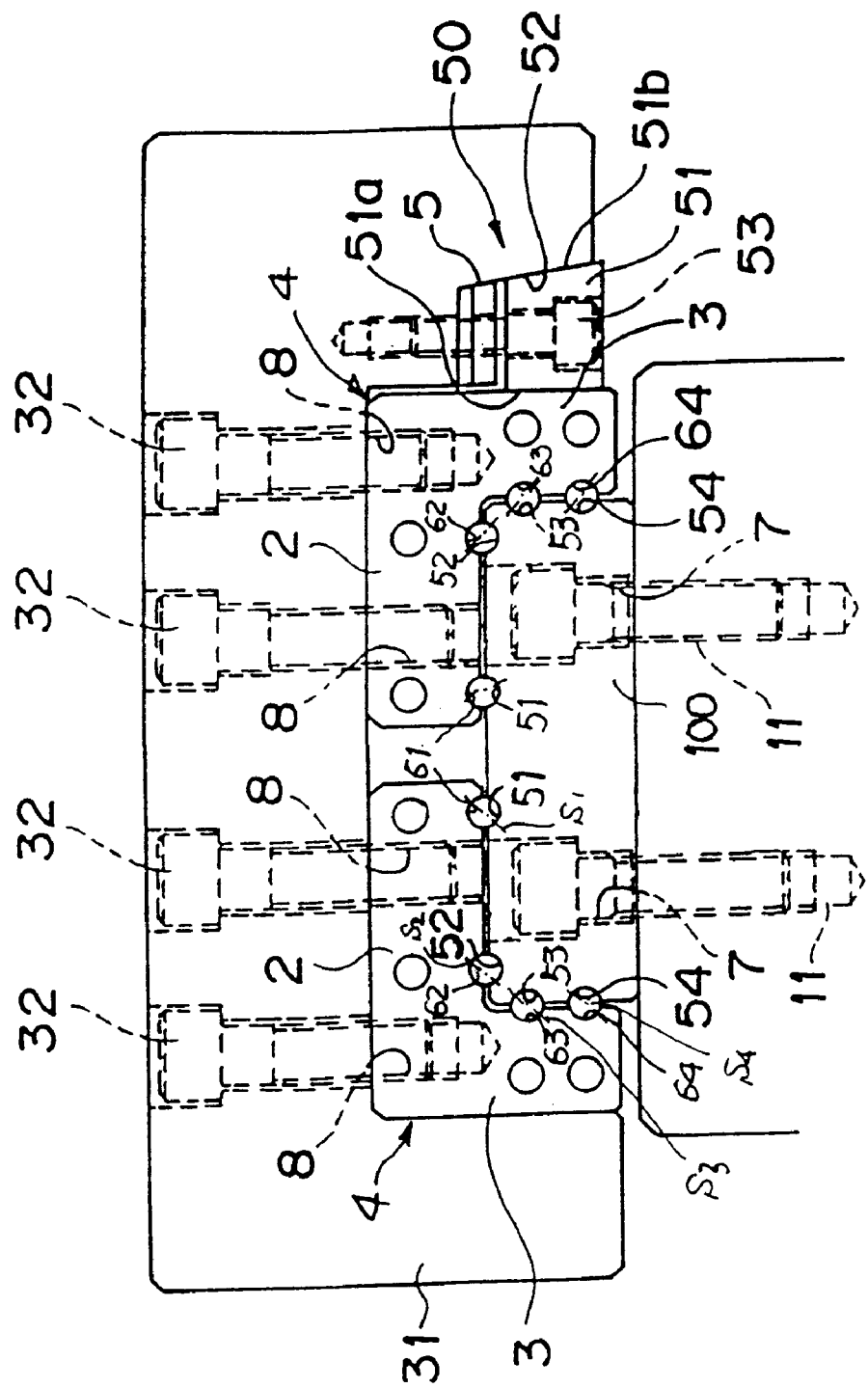
FIG. 10 is a cross sectional view showing one embodiment of a table guide device according to the present invention in which still further embodiment of the linear motion guide device is used.

FIG. 10 shows a construction of a table guide device in which the paired track rails of the linear motion guide devices shown in FIG. 2 are replaced with a track rail 100 having a wide width. It is to be noted that the structure of the movable block 4 is substantially the same as that of the movable block 4 shown in FIG. 1, so that the detailed structure of the device shall be referred to FIG. 1 and corresponding explanations, if necessary. In such case, the explanations shall be read upon replacing the term "track rail 1" with "track rail 100".

That is, the device is constructed by comprising a track rail 100 having a wide width and rectangular shape in section to which at least one row of ball rolling groove, i.e., two rows of ball rolling grooves in this case as shown in FIG. 10, are formed at right and left half portions of the upper surface and the right and left side surfaces of the track rail 100 and a pair of movable blocks 4 and 4 to be assembled to both right and left corner portions of the track rail 100.

That is, the linear motion guide device comprises:

a track rail provided with at least one ball rolling groove, i.e., a pair of two rows of ball rolling grooves 51, 52, 53 and 54 formed to the right and left half portions of the upper surface and the right and left side surfaces of the track rail 100 having a wide width, respectively;

a pair of movable blocks 4 and 4 provided on right and left corner portions between the upper surface and the right and left side surfaces of the track rail 100, each of the movable blocks 4 and 4 having an L-shaped cross section and further comprising a horizontal portion 2 provided with ball rolling grooves 61 and 62 corresponding to the ball rolling grooves 51 and 52 formed to the right and left half portions of the upper surface of the track rail 100 and a suspending portion 3 provided with ball rolling grooves 63 and 64 corresponding to the ball rolling grooves 53 and 54 formed to the right and left side surfaces of the track rail 100;

rows of rolling balls B1 and B2 disposed to be rollable between the upper surface of the track rail 100 and the ball rolling grooves 51 and 64 formed to the horizontal portions 2 and 2 of the paired movable blocks 4 and 4; and rows of rolling balls B3 and B4 disposed to be rollable between the right and left side surfaces of the track rail 100 and the ball rolling grooves 54 and 64 formed to the suspending portions 3 and 3 of the paired movable blocks 4 and 4.

In addition, each of the ball rolling grooves 51, 61; 52, 62; 53, 63; 54, 64 is formed to provide a deep-grooved shape having a circular-arc-shape in section, and a groove depth is set to approximately ⅓ to ½ of a diameter of the rolling ball.

In addition, each of the contact angle lines S1 and S2 each constituted by a line connecting the two contact points of the rolling ball disposed between the corresponding ball rolling grooves 51, 61; 52, 62 formed to the horizontal portions 2 and 2 of the paired movable blocks 4 and 4 and the upper surface of the track rail 100 is set to extend toward the track rail 100 and is formed so as to incline toward a side of the respective suspending portions 3 and 3 of the paired movable blocks 4 and 4 with respect to a vertical line V passing a center of the rolling ball, while each of the contact angle lines S3 and S4 each constituted by a line connecting the two contact points of the rolling balls B3 and B4 disposed between the corresponding ball rolling grooves 53, 63; 54, 64 formed to the suspending portions 3 and 3 of the paired movable blocks 4 and 4, and the side surfaces of the track rail 100 is set to extend toward the track rail 100 and is formed so as to incline toward a side of the horizontal portion 2 of the respective movable blocks 4 and 4 with respect to a horizontal line H passing a center of the rolling ball.

Further, each of the right and left half portions of the upper surface and the right and left side surfaces of the track rail 100 is provided with two rows of ball rows B1, B2; B3, B4 which has a contact angle arrangement so that the contact angle lines thereof are inclined to the same direction to each other.

In addition, bolt holes 8 and 8 for inserting attaching-bolts are provided at corresponding central portions between the two rows of the ball rolling grooves 61 and 62 of the horizontal portions 2 and 2, and the bolt holes 8 and 8 are also provided at base portions of the suspending portions 3 and 3, respectively.

As described above, the structure of the movable blocks 4 and 4 is substantially the same as that of the movable block 4 shown in FIG. 1, and the movable blocks 4 and 4 can be subjected to a grinding work using a large-sized grinding stone with a high efficiency to form the deep-groove type ball rolling grooves 61–64.

In addition, the track rail 100 is fixed to the fixed bed 20, and the the table 30 is fixed to the paired movable blocks 4 and 4. The track rail 100 is a rail having a wide width thereby to increase the stability of the device.

Further, due to an employment of the track rail 100 having wide width, the load bearing ability with respect to an angular moment around a center axis of the track rail 100 can be increased.

Furthermore, even in a case of assembling the table guide device, a pair of guide rails are not required and it is sufficient to prepare only one track rail 100, whereby an applicable range of the table guide device can be broadened. In particular, in a case where a pair of the track rails are used, the paired track rails are required to have a high attaching performance. However, the requirement for such attaching accuracy can be neglected in this case because of using one track rail.

Further, in a case where such paired movable blocks 4 and 4 are assembled to one track rail 100, as a matter of course, the movable block shown in FIGS. 4 and 6 will also be applicable to the device as the movable blocks 4.

According to the present invention as described above, the movable block is formed in an L-shape in section and has a load bearing structure in which only the upper surface and one side surface of the track rail are supported by the horizontal portion and the suspending portion at a right angle, so that it becomes possible to increase a degree of freedom in a direction for inclining the horizontal portion and the suspending portion around a corner portion between the horizontal portion and the suspending portion. Therefore, even if the track rail and the movable block are formed with a working error or the device is formed with an error in a degree of parallelism between a mating surface to which the track rail is attached and a mating surface to which the movable block is fixed, a position of the movable block can be automatically controlled or adjusted by displacing the contact points of the rolling balls rolling in the ball rolling grooves.

In addition, each of the ball rolling grooves is formed so as to have a deep-grooved shape. Therefore, even if the contact points of the rolling balls are displaced by the automatically controlling function, the rolling balls will contact to intermediate portions of an inner circumferential surface of the ball rolling groove, the intermediate portions being far deep positions from a side peripheral edge portion of the ball rolling groove. As a result, a load to be applied to the rolling ball can be dispersed and supported by the inner circumferential surface of the ball rolling groove, and there is no fear of edge-load being applied to the side peripheral corner portion of the ball rolling groove, thus achieving a high automatic controllability.

Further, the movable block is formed to be opened at one side thereof, so that the movable block can be subjected to a grinding work using a large-sized grinding stone to form the ball rolling grooves. In addition, even in a case of the deep-groove type, the grinding work can be performed at a high efficiency, thus improving the productivity of the device.

Furthermore, the movable block is formed in an L-shape and has no under-cut portion, and the track rail is also formed in a simple rectangular-shape in section, so that the movable block can be easily formed by a drawing operation and the productivity can be improved.

On the other hand, a contacting direction of the ball row disposed at the ball rolling grooves formed to the upper surface of the track rail is set to extend toward the track rail and is formed so as to incline toward a side of the suspending portion of the movable block with respect to a vertical line passing a center of the rolling ball, while a contact direction of the ball row disposed at the side surface of the track rail is set to extend toward the track rail and is formed so as to incline toward a side of the horizontal portion of the movable block with respect to a horizontal line passing a center of the rolling ball. Due to the structure described above, a load to be applied in four directions can be born by a single movable block.

In addition, when each of the upper surface and the side surface of the track rail is arranged with at least two rows of rolling balls respectively and at least two rows of the rolling balls arranged at the upper surface and the side surface of the track rail have a contact-angle structure in which the contact angle lines of the respective rolling balls are inclined in the same direction, the load bearing ability can be increased without impairing the automatic controllability between the track rail and the movable block.

In addition, when at least one of a return passage constituting the ball returning passage structure and an inner circumference guide portion constituting an inner circumferential guide structure of the ball rolling direction turning passage is formed of a molding-shaped portion which is integrally formed to the movable block body by an insert molding method in which the mold-shaping operation is performed by inserting the movable block body into a shaping mold, the mold-shaping of the movable block can be easily performed.

In addition, when the horizontal portion and the suspended portion are fastened to a table, the movable block is reinforced by the table, so that the rigidity of the device can be increased.

Further, when the position of the ball rolling grooves to be formed on the upper surface of the track rail is arranged to one side portion and the bolt inserting hole for fastening the track rail is formed at the other side portion, it can be possible to prevent an extraneous substance from invading into the ball rolling grooves.

Furthermore, when the horizontal portion of the movable block is provided with a skirt portion having a length shorter than that of the suspending portion, the skirt portion being formed at a side surface opposing to the side surface of the horizontal portion to which the suspending portion is formed, and a row of rolling balls are disposed to be rollable between corresponding a pair of ball rolling grooves formed to the skirt portion and the side surface of the track rail, even if a load in a direction for lifting the movable block from the track rail is applied to the device, the movable block is firmly supported by not only one side surface but also both side surfaces of the track rail, so that the load bearing ability against the lifting load can be increased.

On the other hand, according to the table guide device of this invention, a pair of right and left movable blocks are fixed to the table, so that the device as a whole has a construction in which the side surfaces of the right and left track rails are clamped by the suspended portions of the respective right and left movable blocks. Therefore, as a whole, the rigidity in the direction for rotating the movable blocks around the track rails is increased, and there can be realized a table guide device having a high load bearing performance against the loads in every direction including the horizontal and vertical directions.

Further, even if there are working errors or the like to attaching surfaces of the track rails and the movable blocks, the automatic controlling function of the linear motion guide device is effected as described above, so that the misalignment between the track rail and the movable block is absorbed and automatically controlled by the displacements of the contact points of the balls rolling within the ball rolling grooves. As a result, the table can be smoothly guided.

In addition, the ball rolling grooves can be simultaneously formed by a grinding operation in a state where the two rows of track rails are fixed in parallel to each other, so that the parallel tracks and grooves having a high accuracy can be obtained.

Furthermore, when the table is provided with supporting walls for supporting rear surfaces of the suspending portions of the respective right and left movable blocks, the load in a horizontal direction applied to the table is directly transferred to the movable blocks not through the attaching bolts but through the supporting walls, and then the load is transferred from the movable blocks to the track rails thereby to be directly supported by the reference walls of the fixed bed. Accordingly, the load in a horizontal direction would not apply from a shearing direction to the attaching bolt for fastening the movable block or the attaching bolt for fastening the track rail, so that there can be provided a table guide device with a structure having an extremely high rigidity.

In addition, a preload controlling mechanism is provided between at least one of the supporting walls and the suspending portion of the movable block, the preload controlling mechanism being constructed in a manner that the movable block is forcibly pressed to a side of the track rail by utilizing the supporting wall as a supporting member so as to increase a preload of the balls disposed between the movable blocks and track rails, a reaction force applied to the supporting wall as a reaction force of the pressing force is applied to another supporting wall through the table, then a suspending portion of another movable block is pressed to another track rail by the reaction force, thereby to increase the preload of the balls. When the preload controlling mechanism described above is provided for the table guide device, the supporting rigidity of the whole table can be increased.

In particular, when a tapered gib formed of a block body face-contacting to the rear surface of the suspending portion is used as the preload controlling mechanism and disposed between the supporting wall and the suspending portion of the movable block, it is possible to uniformly impart the preload to the ball rows. In addition, the rigidity between the suspending portion and the supporting wall can also be maintained to a high level.

INDUSTRIAL APPLICABILITY

As described above, the linear motion guide device and the table guide device using the linear motion guide device according to the present invention are valuable as a linear guide mechanism for various industrial equipments such as machine tool, inspection instrument, robot operating system or the like.

What is claimed is:

1. A linear motion guide device comprising:
   a track rail having a rectangular-shape in section and at least one ball rolling groove formed to both an upper surface and one side surface of the track rail, respectively;
   a movable block having an L-shape in section, comprising a horizontal portion provided with ball rolling grooves corresponding to ball rolling grooves formed to the upper surface of the track rail and a suspending portion provided with ball rolling grooves corresponding to ball rolling grooves formed to the one side surface of the track rail; and
   a row of rolling balls disposed to be rollable between corresponding ball rolling grooves formed to the upper surface of the track rail and the horizontal portion of the movable block and between corresponding ball rolling grooves formed to the side surface of the track rail and the suspending portion of the movable block, respectively;
   wherein each of the ball rolling grooves has a circular-arc-shape in section having a deep-groove shape having a groove depth of approximately ⅓ to ½ of a diameter of the rolling ball.

2. A linear motion guide device according to claim 1, wherein a contact angle line constituted by a line connecting two contact points of the rolling ball disposed between the corresponding ball rolling grooves formed to the horizontal portion of the movable block and the upper surface of the track rail is set to extend toward the track rail and is formed so as to incline toward a side of the suspended portion with respect to a vertical line passing a center of the rolling ball, and
   a contact angle line constituted by a line connecting the two contact points of the rolling ball disposed between the corresponding ball rolling grooves formed to the suspending portion of the movable block and the side surface of the track rail is set to extend toward the track rail and is formed so as to incline toward a side of the horizontal portion with respect to a horizontal line passing a center of the rolling ball.

3. A linear motion guide device according to claim 2, wherein said upper surface and the side surface of the track rail are arranged with at least two rows of rolling balls respectively, and said at least two rows of the rolling balls disposed at the upper surface and the side surface of the track rail have a contact-angle structure in which the contact angle lines of the respective rolling balls are inclined in the same direction.

4. A linear motion guide device according to claim 3, wherein said horizontal portion of the movable block is provided with a skirt portion having a length shorter than that of the suspending portion, the skirt portion being formed at a side surface opposing to the side surface of the horizontal portion to which the suspending portion is formed, and a row of rolling balls is disposed to be rollable between a pair of ball rolling grooves formed to the opposing surfaces of the skirt portion and the side surface of the track rail.

5. A linear motion guide device according to any one of claims 1, 2 and 3, wherein said movable block comprise a movable block body having a loaded ball rolling groove and a ball returning passage for returning the ball in the loaded ball rolling groove from one end to the other end of the loaded ball rolling groove and side covers provided for both end portions of the movable block body, the side cover constituting a ball turning passage for changing a ball rolling direction by receiving the rolling ball from the loaded ball rolling groove and then guiding the rolling ball to the ball returning passage,
   wherein at least one of a ball returning passage constituting the ball returning passage structure and an inner circumferential portion constituting an inner circumferential structure of the ball turning passage is formed of a molding-shaped portion which is integrally formed to the movable block body by an insert molding method in which the mold-shaping operation is performed by inserting the movable block body into a shaping mold.

6. A linear motion guide device according to any one of claims 1, 2, 3 and 4, wherein said horizontal portion of the movable block is provided with two rows of ball rolling grooves while said suspending portion is also provided with two rows of ball rolling grooves, and bolt holes for inserting attaching-bolts are formed to both central portions between said two rows of the ball rolling grooves of the horizontal portion and the suspending portion, respectively.

7. A linear motion guide device according to any one of claims 1, 2, 3 and 4, wherein said plural rows of ball rolling grooves to be formed on the upper surface of the track rail are locally disposed to one side surface side of the track rail and a bolt hole for inserting the attaching bolt is formed in a region on the upper surface of the track rail close to the other side surface of the track rail.

8. A table guide device comprising a fixed bed, a pair of linear motion guide devices arranged in parallel with the fixed bed and a table to be assembled through said paired linear motion guide devices, wherein each of said linear motion guide devices comprises: a track rail having a rectangular-shape in section and at least one ball rolling groove formed to both an upper surface and one side surface of the track rail to be fixed to said fixed bed; a movable block having an L-shape in section, comprising a horizontal portion provided with ball rolling grooves corresponding to ball rolling grooves formed to the upper surface of the track rail and a suspending portion provided with ball rolling grooves corresponding to ball rolling grooves formed to the one side surface of the track rail; and a row of rolling balls disposed to be rollable between corresponding ball rolling grooves formed to the upper surface of the track rail and the horizontal portion of the movable block and between corresponding ball rolling grooves formed to the side surface of the track rail and the suspended portion of the movable block, respectively, in which each of said ball rolling grooves has a circular-arc-shape in section having a deep-groove shape having a groove depth of approximately ⅓ to ½ of a diameter of the rolling ball; and wherein said paired track rails of said paired linear motion guide devices are symmetrically disposed on the upper surface of said fixed bed so that the side surfaces of the track rails to which the ball rolling grooves are formed are faced to inside or outside to each other, said side surface of the track rail opposing to the side surface to which the ball rolling grooves are formed is set to be a reference surface for attachment, and said fixed bed is provided with a reference wall for supporting said reference surface for attachment of the track rail.

9. A table guide device according to claim 8, wherein said reference wall is formed so as to have a height corresponding to a height of said ball rolling groove formed to the side surface opposing to the reference surface for attachment.

10. A table guide device according to claim 8, wherein a contact angle line constituted by a line connecting two contact points of said rolling ball disposed between the corresponding ball rolling grooves formed to the horizontal portion of said movable block and the upper surface of said track rail is set to extend toward the track rail and is formed so as to incline toward a side of the suspended portion of the movable block with respect to a vertical line passing a center of the rolling ball, and a contact angle line constituted by a line connecting the two contact points of the rolling ball disposed between the corresponding ball rolling grooves formed to the suspending portion of the movable block and the side surface of the track rail is set to extend toward the track rail and is formed so as to incline toward a side of the horizontal portion of the movable block with respect to a horizontal line passing a center of the rolling ball.

11. A table guide device according to any one of claims 8, 9 and 10 wherein said table is provided with supporting walls for supporting rear surfaces of said suspending portions of the respective right and left movable blocks.

12. A table guide device according to claim 11, wherein said table guide device further comprises a preload controlling mechanism provided between at least one of said supporting walls and said suspending portion of the movable block, the preload controlling mechanism being constructed in a manner that the movable block is forcibly pressed to a side of the track rail by utilizing the supporting wall as a supporting member so as to increase a preload of the balls disposed between the movable blocks and track rails, a reaction force applied to the supporting wall as a reaction force of the pressing force is applied to another supporting wall through the table, then a suspending portion of another movable block is pressed to another track rail by the reaction force thereby to increase the preload of the balls.

13. A table guide device according to claim 12, wherein said preload controlling mechanism is disposed between said supporting wall and said suspending portion of the movable block and is composed of a tapered gib formed of a block body face-contacting to a rear surface of said suspending portion.

14. A table guide device according to claim 8, wherein each of said upper surface and said side surface of the track rail is provided with at least two rows of rolling balls, and the respective two rows or more of rolling balls formed to the upper surface and the side surface of said track rail have a contact angle arrangement so that the contact angle lines thereof are inclined to the same direction to each other.

15. A table guide device according to claim 8, wherein said horizontal portion of the movable block is provided with a skirt portion having a length shorter than that of the suspending portion, said skirt portion being formed at a side surface opposing to the side surface of said horizontal portion to which the suspending portion is formed, and a row of rolling balls is disposed to be rollable between corresponding a pair of ball rolling grooves formed to said skirt portion and the side surface of the track rail.

16. A linear motion guide device comprising:

a track rail provided with at least one ball rolling groove formed respectively to right and left half portions of an upper surface and lateral right and left side surfaces of said track rail;

a pair of movable blocks provided on right and left corner portions between the upper surface and lateral side surfaces of said track rail, each of said movable blocks having an L-shaped cross section and further comprising a horizontal portion provided with ball rolling grooves corresponding to the ball rolling grooves formed to the right and left half portions of the upper surface of said track rail and a suspending portion provided with ball rolling grooves corresponding to the ball rolling grooves formed to said lateral side surfaces of the track rail;

a row of rolling balls disposed to be rollable between the ball rolling grooves formed to the upper surface of said track rail and the horizontal portions of the paired movable blocks and between the ball rolling grooves formed to the lateral side surfaces of the track rail and the suspending portions of the paired movable blocks;

wherein each of said ball rolling grooves is formed to be a deep-grooved shape having a circular-arc-shape in section, and a groove depth is set to approximately ⅓ to ½ of a diameter of the rolling ball.

17. A linear motion guide device according to claim 16, wherein a contact angle line constituted by a line connecting two contact points of the rolling ball disposed between the corresponding ball rolling grooves formed to the horizontal portions of the paired movable blocks and the upper surface of the track rail is set to extend toward the track rail and is formed so as to incline toward a side of the respective suspending portions of the paired movable blocks with respect to a vertical line passing a center of the rolling ball, and a contact angle line constituted by a line connecting two contact points of the rolling ball disposed between the corresponding ball rolling grooves formed to the suspending portions of the paired movable blocks and the side surface of the track rail is set to extend toward the track rail and is formed so as to incline toward a side of the horizontal portion of the respective movable blocks with respect to a horizontal line passing a center of the rolling ball.

18. A linear motion guide device according to claim 17, wherein each of right and left half portions of said upper surface and said lateral right and left side surfaces of the track rail is provided with at least two rows of rolling balls, and the respective two rows or more of rolling balls formed to said upper surface and the lateral side surfaces of said track rail have a contact angle arrangement so that the contact angle lines thereof are inclined to the same direction to each other.

19. A linear motion guide device according to any one of claims 16, 17 and 18, wherein said track rail is a rail having a wide width.

20. A table guide device comprising a fixed bed to which a track rail of a linear motion guide device according to any one of claims 16 to 18 having a first and a second movable blocks is fixed and a table fixed to the first and second movable blocks.

* * * * *